United States Patent [19]

Spirig et al.

[11] Patent Number: 5,160,850
[45] Date of Patent: Nov. 3, 1992

[54] LIGHT BEAM INTERRUPT DETECTION APPARATUS FOR USE IN A VIBRATING ENVIRONMENT

[75] Inventors: Walter J. Spirig, 146 King's Road, Pointe-Claire, Province of Quebec, Canada, H9R 4H4; Jacques Tetrault, St. Eustache, Canada

[73] Assignee: Walter J. Spirig, Pointe-Claire, Canada

[21] Appl. No.: 640,635

[22] Filed: Jan. 14, 1991

[51] Int. Cl.$^5$ .................. G01N 21/86; G01V 9/04
[52] U.S. Cl. .................. 250/561; 250/222.1
[58] Field of Search ............ 250/561, 562, 571, 572, 250/221, 222.1; 19/0.21, 0.22, 0.25; 28/187; 57/81; 66/158, 161, 163; 139/273 A, 336; 242/37 R; 112/273, 80.18

[56] References Cited

U.S. PATENT DOCUMENTS

| | | |
|---|---|---|
| 3,400,270 | 9/1968 | Durig . |
| 3,530,690 | 9/1970 | Nickell et al. . |
| 3,628,030 | 12/1971 | Fertig et al. ............... 250/222.1 |
| 3,812,372 | 5/1974 | Wirtz et al. . |
| 4,177,838 | 12/1979 | Van Wilson et al. ............ 250/561 |
| 4,341,958 | 7/1982 | Ohsawa ................. 250/561 |
| 4,455,549 | 6/1984 | Rydborn ................. 57/81 |
| 4,549,086 | 10/1985 | Herzer ................... 250/561 |
| 4,602,582 | 7/1986 | Rawson ................. 112/273 |
| 4,620,321 | 10/1986 | Chown . |
| 4,948,260 | 8/1990 | Felix et al. ............... 250/571 |
| 5,017,797 | 5/1991 | Uramoto et al. ............ 57/81 |

FOREIGN PATENT DOCUMENTS 1103776  6/1981  Canada .

Primary Examiner—David C. Nelms
Assistant Examiner—John R. Lee
Attorney, Agent, or Firm—Collard & Roe

[57] ABSTRACT

A light beam interrupt detection apparatus for use in a vibrating environment comprises a light source for producing a beam of light, a light receiver for receiving and detecting the beam, the receiver having a detector surface sufficiently larger than the beam such that the beam strikes the detector surface as the beam moves during vibrations, and the receiver producing an output signal which is substantially constant when the beam moves over the detector surface without the beam being broken, the output signal to be fed to a signal processor for detecting an interrupt of the beam by an object. The apparatus may be used on a mechanical loom, and the signal processor may detect a variation in the output signal caused by a partial interrupt of the beam, the object being a thread of the loom which is so dimensioned as to block only a part of the beam the thread passes through the beam.

20 Claims, 1 Drawing Sheet

LIGHT BEAM INTERRUPT DETECTION APPARATUS FOR USE IN A VIBRATING ENVIRONMENT

FIELD OF THE INVENTION

The present invention relates to a light beam interrupt detection apparatus for use in a vibrating environment. The invention relates further to a light beam interrupt detection apparatus for use in a vibrating environment wherein a partial interrupt of the light beam is detected when an object smaller than the beam passes therethrough.

BACKGROUND OF THE INVENTION

Light beam interrupt detection apparatus are used in a wide variety of applications to detect the motion and position of objects without physically disturbing the object whose movement or position is detected. Under certain circumstances, namely when either the light source creating the light beam or the light receiver detecting the light beam or both are connected to a surrounding object or environment which is vibrating or being vibrated, the reliability of the interrupt detection is compromised. Obviously, a small vibration causing a change in angle of the light source placed at a great distance from the light receiver will cause the light beam to miss the light receiver.

When operating in a vibrating environment, it is known to use a light beam which is sufficiently large that as the beam wanders during vibrations, sufficient light is received by the receiver such that an interrupt by an object can be detected. A larger beam however requires a larger light source and will consume more power at the light source for generating a larger beam.

Also, using a smaller receiver with a wider beam, which will help keep the beam on the receiver in order to operate in a vibrating environment, will reduce the amount of useable signal from the light receiver since less light is received, possibly decreasing the signal to noise ratio at the receiver and lowering the reliability of the interrupt detection.

It is therefore an object of the invention to provide a light beam interrupted detection apparatus for use in a vibrating environment which is able to use a minimum power light source without compromising the reliability of the interrupt detection.

SUMMARY OF THE INVENTION

According to the invention, there is provided a light beam interrupt detection apparatus for use in a vibrating environment comprising: a light source for producing a beam of light; a light receiver for receiving and detecting the beam, the receiver having a detector surface sufficiently larger than the beam such that the beam strikes the detector surface as the beam moves during vibration. The receiver produces an output signal which is substantially constant as the beam moves over the detector surface without the beam being broken. The output signal of the receiver is to be fed to signal processing means for detecting an interrupt of the beam by an object.

Preferably, the signal processing means detect a variation in the output signal caused by a partial interrupt of the beam, the object being so dimensioned as to block only a part of the beam as the object passes through the beam.

Preferably, the light source may comprise a laser diode and the receiver may comprise a single silicon photocell. The invention is preferably used in conjunction with a mechanical loom to detect broken threads.

DETAILED DESCRIPTION OF THE PREFERRED EMBODIMENT

Figure 1:
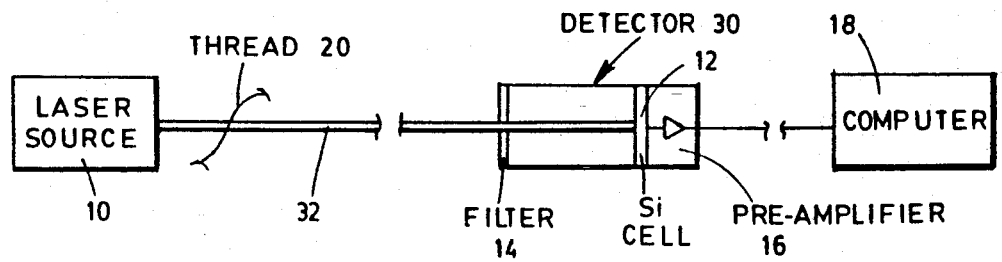
FIG. 1 is a block diagram of the light beam interrupt detection apparatus according to a preferred embodiment.

As shown in FIG. 1, the apparatus according to the preferred embodiment comprises a laser source (10) which produces a laser beam (32) having minimal divergence. At a substantial distance from the laser source (10), a light receiver (30) is positioned to receive light beam (32). Receiver (30) includes a light filter (14) which allows only light of a frequency substantially equal to that of the beam (32) to enter the housing of the receiver (30) is cylindrical in shape and is made of aluminum which is black anodized on its inside. Positioned towards the rear of receiver (30) is a silicon photocell sensor (12) which produces an electrical output signal which is substantially constant as the beam (32) moves over the surface of cell (12). A preamplifier circuit (16) to be described in detail hereinbelow is included in the light receiver (30) in close proximity to cell (12). The signal generated by preamplifier (16) can then be transmitted over shielded cable to a remote computer (18).

In the preferred embodiment, photocell (12) is a standard silicon photocell having a receiver surface free of non-transparent electrodes and of equal efficiency over its surface, which is hand-selected to respond highly at approximately 672 nanometers. The sensitivity is chosen such that a 1.0 mW laser diode beam of 672 nanometers wavelength having a diameter of 3.0 mm produces an output of 0.08 V. Filter (14) may comprise red plexiglass (No. 2423 by Rohm & Haas). Beam (32) is approximately 5 to 6 mm in diameter and has a power level of approximately 1 mW. The laser source (10) may use a laser diode such as the Toshiba T0LD9211 which uses a maximum of 5 mW.

Figure 2:
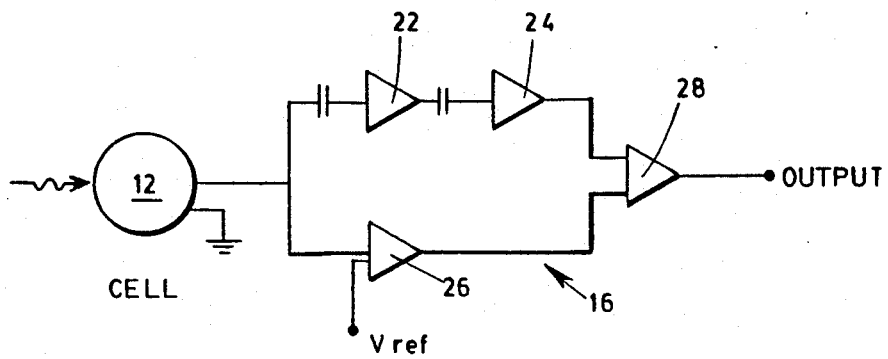
FIG. 2 is a schematic block diagram of the light detector and preamplifier circuit according to the preferred embodiment.

As shown in FIG. 2, silicon photocell (12) is connected to preamplifier (16) which utilizes a two stage AC amplifier using amplifiers (22) and (24). The output of the second stage amplifier (24) is fed to the positive input of amplifier (28).

If beam (32) is completely blocked by an object or if a vibration should cause beam (32) to move completely away from cell (12), the output level on amplifier (26) will rise, indicating that the voltage level detected at cell (12) is below the minimum value (Vref). A false detection of an interrupt of beam (32) can be prevented by using amplifier (26). Amplifier (28) serves the purpose of maintaining the output signal low when receiving a signal from amplifier (26) and also of boosting the current level of the amplifier voltage signal coming from amplifiers (22) and (24).

Figure 3:
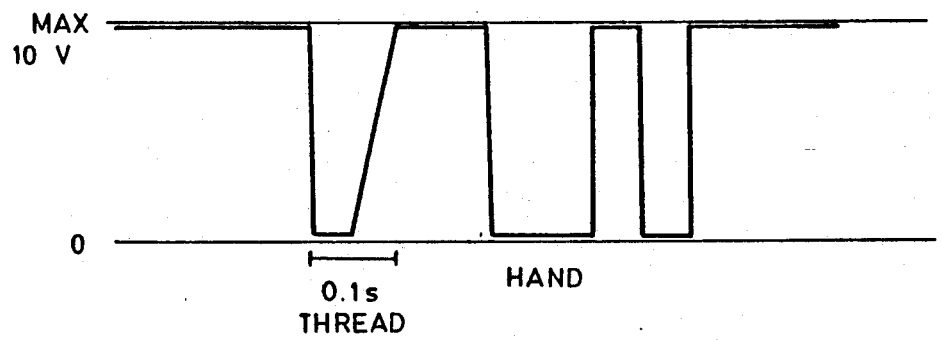
FIG. 3 is a graph showing an example of the output signal according to the preferred embodiment.

The advantages of the preamplifier (16) construction shown in FIG. 2 can best be understood by referring to FIG. 3 which shows the output of amplifier (28) as thread (20) passes through beam (32) and as a full break of beam (32) is caused to happen by, for example, placing a hand in front of beam (32). Preamplifiers (22) and (24) operate such that their output is usually high at 10 V, and such that the variation in the voltage generated by cell (12) as thread (20) passes through beam (32) will cause the output of amplifier (24) to drop to zero.

As a thread (20) passes through beam (32), the DC level discriminator (26) will indicate that the voltage generated by cell (12) does not drop below the threshold value (Vref), while the two stage AC amplifier (22) and (24) will amplify the rapidly dropping signal to produce a zero output at amplifier (28). In the case of a larger object blocking the laser source (10), amplifier (26) will detect that the level of the signal emitted by cell (12) has dropped below the threshold reference, and will cause amplifier (28) to set the output signal to zero. As the signal at cell (12) goes to zero, the AC amplifier (22) and (24) will generate a zero output signal for a brief period of time and then will return to producing the 10 V output signal given that the voltage at cell (12) remains constant with beam (32) blocked. This means that without the threshold detector amplifier (26) the blocking of beam (32) would cause the output signal to drop from 10 V to zero and then return back to 10 V which would not be distinguished from a thread 20 passing through. With the addition of the threshold detection amplifier (26), the output signal from amplifier (28) is kept at zero even while the output from amplifier (24) returns to 10 V. When the hand is removed from beam (32) as shown in FIG. 3, the fluctuation in the voltage of cell (12) will cause amplifiers (22) and (24) to drop their output signal from 10 V down to zero and then back up to 10 V.

In the preferred embodiment, the length of the zero voltage state of the output signal is measured by computer (18) to determine whether the output signal represents a thread passing through beam (32), i.e. an alarm signal to shut down the mechanical loom, or a false alarm interrupt of beam (32) as would be caused by a hand or a failure of laser source (10). The previous two conditions are represented by short and long zero state pulses respectively. When a longer duration zero voltage state is detected, the following rise, drop and rise in the output signal is ignored so as to avoid triggering a false alarm. Although a false alarm detection is not used to cause an immediate shut down of the loom, an operator is warned by the computer of the condition. The output signal which leaves the preamplifier is essentially a digital HI/LO signal which the computer (18) can easily process.

Although in the preferred embodiment, the preamplifier circuit (16) includes a threshold detector, it is of course possible to amplify the signal of cell (12) and pass it directly to computer (18) for analysis. Although in the preferred embodiment, small AC fluctuation in the voltage generated by cell (12) are used, it can be appreciated by one skilled in the art that it is also possible to use the DC signal from cell (12) in order to detect an interrupt or partial interrupt of beam (32), especially in cases where a substantial part of light beam (32) is blocked as the object (20) passes therethrough. It can of course be appreciated that the detection of thread (20) having a diameter as small as 0.02 mm requires very high sensitivity.

Although the invention has been described above with reference to the preferred embodiment, it is to be understood that such description is not intended to limit the scope with the invention as defined in the appended claims.

What is claimed is:

1. A light beam interrupt detection apparatus for use in a vibrating environment comprising:
    a light source for producing a beam of light;
    a light receiver for receiving and detecting said beam, said receiver having a detector surface sufficiently larger than said beam such that said beam strikes said detector surface as said beam moves during vibrations: and said receiver producing an output signal which is substantially constant when said beam moves over said detector surface without said beam being broken; and
    signal processing means to be connected to said output signal for detecting an interrupt of said beam by an object.

2. The apparatus as claimed in claim 1, wherein said signal processing means comprise an AC signal detector for detecting a variation in said output signal caused by a partial interrupt of said beam, said object being so dimensioned as to block only a part of said beam as said object passes through said beam.

3. The apparatus as claimed in claim 1, wherein the light source comprises a laser diode.

4. The apparatus as claimed in claim 1, wherein the receiver is a single silicon photocell.

5. The apparatus as claimed in claim 1, wherein the light receiver comprises a housing in which said detector surface is provided, and a light filter for blocking ambient light and allowing said beam of light to pass therethrough.

6. The apparatus as claimed in claim 2, wherein the light source and the light receiver are mounted to a mechanical loom, and said object is any one of a plurality of threads provided on said mechanical loom.

7. The apparatus as claimed in claim 6, wherein the light receiver is a single silicon photocell.

8. The apparatus as claimed in claim 6, wherein the light receiver comprises a housing, a substantially monochromatic light filter for allowing light of a frequency of said beam of light to pass therethrough, said light source comprising a laser diode.

9. The apparatus as claimed in claim 7, wherein said signal processing means comprise a high sensitivity AC amplifier and a DC threshold voltage level detector.

10. The apparatus as claimed in claim 9, wherein said signal processing means further comprise a gate connected to an output of said AC amplifier and an output of said threshold detector for suppressing the output of said high sensitivity AC amplifier while said threshold detector detects a predetermined low level of signal.

11. The apparatus as claimed in claim 6, wherein said beam is between 4 and 9 mm in diameter, said thread is between 0.02 and 1 mm in diameter, and said receiver comprises a silicon photocell having a diameter of at least 3 cm.

12. The apparatus as claimed in claim 8, wherein said detector surface is spaced from said filter, and a portion of said housing between said filter and said detector surface is absorbent to said beam of light, whereby stray light coming through said filter and not directly striking said detector surface is substantially absorbed by said portion.

13. The apparatus as claimed in claim 5, wherein said detector surface is spaced from said filter, and a portion of said housing between said filter and said detector surface is absorbent to said beam of light, whereby stray light coming through said filter and not directly striking said detector surface is substantially absorbed by said portion.

14. A light beam interrupt detection apparatus for use in a vibrating environment comprising:
   a light source for producing a beam of light:
   a light receiver for receiving and detecting said beam, said receiver having a detector surface sufficiently larger than said beam such that said beam strikes said detector surface as said beam moves during vibrations; and said receiver producing an output signal which is substantially constant when said beam moves over said detector surface without said beam being broken.

15. The apparatus as claimed in claim 14, in combination with signal processing means to be connected to said output signal for detecting an interrupt of said beam by an object said signal processing means comprise an AC signal detector for detecting a variation in said output signal caused by a partial interrupt of said beam, said object being so dimensioned as to block only a part of said beam as said object passes through said beam.

16. The apparatus as claimed in claim 15, wherein the light source and the light receiver are mounted to a mechanical loom, and said object is any one of a plurality of threads provided on said mechanical loom.

17. The apparatus as claimed in claim 16, wherein the light receiver is a single silicon photocell.

18. The apparatus as claimed in claim 16, wherein the light receiver comprises a housing, a substantially monochromatic light filter for allowing light of a frequency of said beam of light to pass therethrough, said light source comprising a laser diode.

19. The apparatus as claimed in claim 17, wherein said signal processing means comprise a high sensitivity AC amplifier and a DC threshold voltage level detector.

20. The apparatus as claimed in claim 19, wherein said signal processing means further comprise a gate connected to an output of said an output of high sensitivity AC amplifier and said threshold detector for suppressing the output of said high sensitivity AC amplifier while said threshold detector detects a predetermined low level of signal.

* * * * *